F. B. RAE
SYSTEM OF MOTOR CONTROL.
APPLICATION FILED FEB. 18, 1910.
975,572. Patented Nov. 15, 1910.
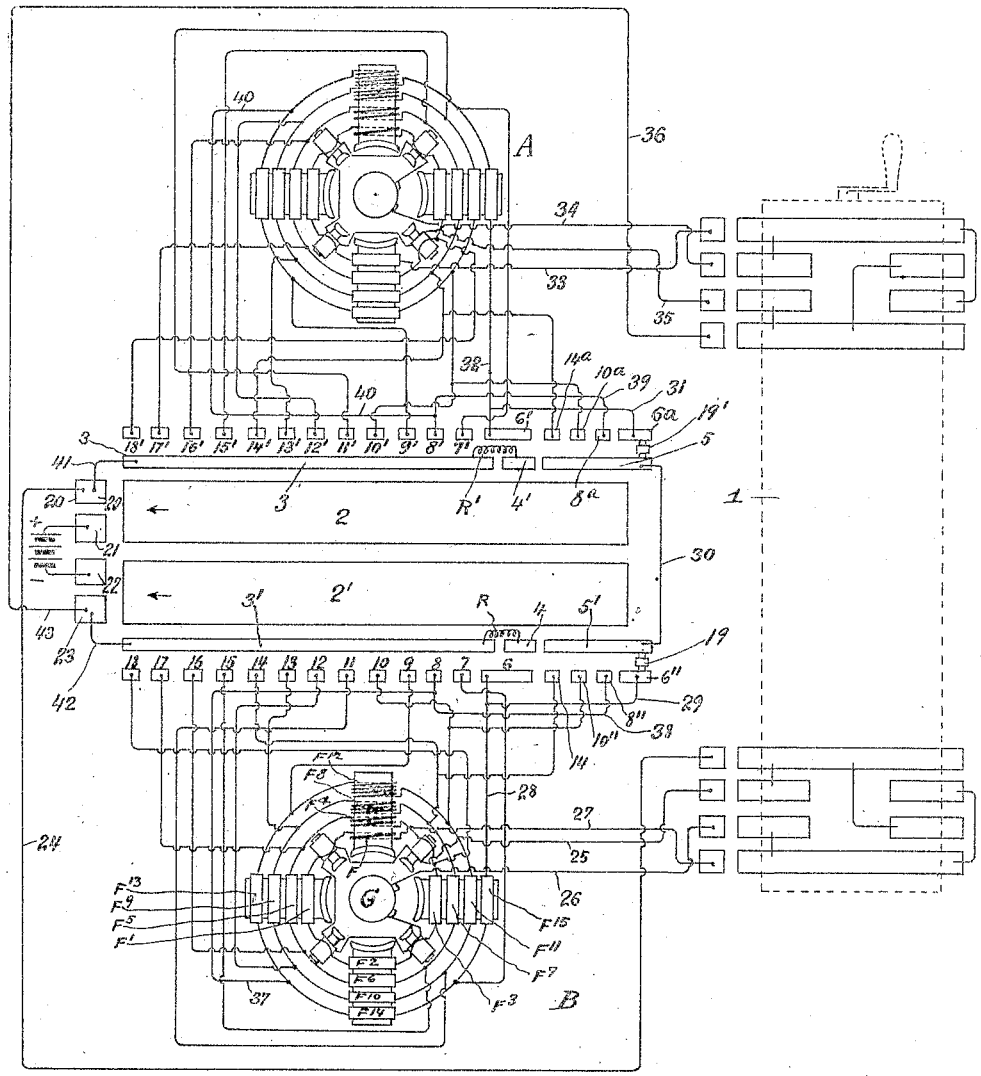

UNITED STATES PATENT OFFICE.

FRANK B. RAE, OF BOSTON, MASSACHUSETTS.

SYSTEM OF MOTOR CONTROL.

975,572.

Specification of Letters Patent.   Patented Nov. 15, 1910.

Application filed February 18, 1910. Serial No. 544,540.

*To all whom it may concern:*

Be it known that I, FRANK B. RAE, a citizen of the United States, residing at Boston, in the county of Suffolk and State of Massachusetts, have invented certain new and useful Improvements in Systems of Motor Control, of which the following is a full, clear, and exact specification.

This invention relates to system of motor control, and has particular reference to the control of two or more electric motors by a single controller, as for the operation of street cars or other electrically propelled cars.

While the invention may be used with any source of current, it is particularly adapted to the control of motors operated by storage batteries, which latter require that the maximum current be within the safe discharge rate.

The motors are preferably of the multipole inter-pole type series wound, wherein the field windings consist of a plurality of groups of coils, one coil of each group being upon each pole-piece, and each group being controllable as a unit to vary the motor speed. Such a motor and method of control, result in a system attaining the highest economy in the use of current during the period of starting and accelerating the motor with a maximum torque, and with sparkless commutation. For this purpose, I use a very large number of turns upon the field magnets which connected in series have a high ohmic resistance, permitting a relatively small current to pass through the entire motor circuit but giving the maximum excitation and a saturated field, while the armature current is reduced to just the amperes necessary to produce the required starting effort. To prevent armature reaction at this time, I employ series inter-poles of relatively high magnetic strength, and thereby prevent any shifting of the point of commutation, the motors running sparkless under all variations or conditions of field magnetization. Under this maximum condition of field magnetization, the armatures will produce the necessary counter potential at slow speed, and will exert a high torque capable of starting the motors from rest with full load, with a small current. The motors and their loads are then accelerated by gradually cutting out the groups of turns on the field magnets, thus reducing the effective turns, and consequently the field magnetization until maximum speed is attained.

In carrying out the invention, I have provided a method and apparatus whereby the motors and all windings are first connected in series with each other and the source; then speeded up by reducing the effective magnetizing field turns; then connected in multiple with the source without opening the circuit or materially increasing the current flow, by reinserting the field windings previously removed; and lastly increasing the speed by again reducing the effective magnetizing turns on each motor.

The invention will be more fully understood in connection with the description of the accompanying drawing which shows diagrammatically an embodiment of the invention.

1 is a reversing controller of the usual type used for street railway controllers in which the upper set of contacts are revolved to reverse the armature current in motor A and the lower contacts to reverse the armature circuit in motor B; 2—2' are developed rings upon a short cylinder, their ends being separated by an air space; 3—3', 4—4', 5—5' are stationary contact segments of a disk, supported from the frame of the controller through the center of which the controller handle, attached to the insulated cylinder of supports for 2—2', passes. Contacts 6—7—8—9—10—11—12—13—14—15—16—17—18 and 6'—7'—8'—9'—10'—11'—12'—13'—14'—15'—16'—17'—18' and also 6"—8"—10"—14"—6ª—8ª—10ª—14ª are segments supported upon insulated disks. Contacts 19—19' are supported upon an insulating arm attached to the shaft of the controller, upon which are mounted the supports for the contact plates 2—2', and these contacts 19—19' serve to make electrical connection between the stationary plates 3—4—5, 3'—4'—5' and the contact segments 6 to 18 and 6' to 18'.

As will be explained, 20—21—22—23 are stationary contacts, in such relation that when the controller cylinder, supporting the contact rings 2—2', is turned in the direction of the arrow, electrical connection is made between contacts 20—21 through plate 2 and from contact 22—23 through plate 2".

A, B, are electric motors, having interpole magnets and sectional windings upon the main field magnets.

The coils F, F¹, F², F³, are in circuit at all running positions, and consist of a relatively small number of turns of coarse wire, having low resistance. The coils $F^4$, $F^5$, $F^6$, $F^7$, consist of more turns of finer wire of greater resistance, the coils $F^8$, $F^9$, $F^{10}$, $F^{11}$, of still more turns of still finer wire and greater resistance, and the coils $F^{12}$, $F^{13}$, $F^{14}$, $F^{15}$, of still more turns and resistance and finer wire. It will therefore be seen that as these groups of coils are successively removed by the controller, commencing with the latter group $F^{12}$, etc., the magnetizing ampere turns and ohmic resistance of the whole circuit decrease progressively, thus permitting a somewhat larger current flow through the turns of the groups remaining. Such increased current flow will be automatically held down by the resistance of the coils and the counter potential of the motor to such amount as will be within the normal discharge rate of the supply battery. As the controller progressively reduces the field magnetizing turns, the ohmic resistance also diminishes, thereby somewhat increasing the current flow through the whole circuit, and thus varying the interpole magnetization to secure sparkless commutation at different speeds and loads.

The object of this invention is to produce a controller for two motors of this type, and to further effect the economy of operation by first connecting the two motors in series with the source of electrical supply cutting out certain of the coils to bring the motor up to a certain speed, and then to connect the motors in parallel with the source of supply, and simultaneously therewith, reintroduce into each motor circuit all of these windings or coils, then to further increase the speed of the motors by again successively cutting out the coils and progressive groups of coils until maximum speed is obtained.

Referring now to the drawing and assuming that the reversing switch has been turned in the direction of the arrow until the contact rings thereon bear upon the stationary contacts shown and left in this position, and then assuming that the controller lever has been moved to bring the contact plate 2 in electrical connection with the stationary contacts 20 and 21 and the plate 2′ in contact with 22 and 23 and the circuits may then be traced as follows:—from the battery to contact 21 plate 2, contact 20, wire 24, through the lower reversing switch to wire 25, through the inter-pole coils to motor B, through armature G, wire 26, through lower reversing switch to wire 27, through field coil F—$F^1$—$F^2$—$F^3$—$F^4$—$F^5$—$F^6$—$F^7$—$F^8$—$F^9$—$F^{10}$—$F^{11}$—$F^{12}$—$F^{13}$—$F^{14}$—$F^{15}$ to wire 28, branch wire 29 to contact 6″ through brush contact 19 to stationary contact 5′, by wire 30 to stationary contact 5, brush contact 19′, stationary contact $6^A$, wire 31 to wire 32, thence through all of the field windings of motor A to wire 33, through the contacts and plates on the upper part of the reversing switch through wire 34 to the armature and inter-pole coils of motor A again through the reversing switch through wires 35 and 36, thence to contact 23, movable plate 2′ to contact 22 and thence to the battery, completing a circuit of both motors in series through all of their windings. If now the controller handle is moved farther in the direction of the arrow, contact is constantly maintained between stationary contact 20 and 21, through plate 2 and between 22 and 23, through plate 2′, while the movable brush contacts 19 and 19′ are rotated until the contact 19 connects the plate 5′ with the contact 8″ and the brush 19′ connects the plate 5 with the contact $8^a$. The circuit may then be traced as before through the field coils to and including $F^{13}$, thence by wire 37 and 38 to contact 8″, brush 19, contact 5′, wire 30 to plate 5 to brush 19′, contact $8^A$ thence through the motor A by wire 39 and 40, thence to wire 36 and back to the battery. In this position of the controller, contacts 19 and 19′, it will be seen that the field coils $F^{14}$ and $F^{15}$ on motor B and similar coils on motor A are removed from the circuit.

Without tracing the circuit for each successive movement of the controller, it will be understood that one or more coils of each motor are successively cut out, as the contact brushes 19 and 19′ are moved still farther in the direction of the arrows. When these brushes 19 and 19′ have progressed until brush 19 connects the segment 4 with the segment 6, and brush 19′ connects 4′ and 6′ then circuit may be traced as follows:— from the battery to contact 21, plate 2, contact 20, wire 24 through the lower reversing switch contacts and the inter-pole coils and armature of motor B to wire 27 successively to all of the field coils of motor B to wire 28, contact plate 6, brush 19, contact 4 through the resistance R to contact plate 3′, wire 42 to contact 23, plate 2′, contact 22 to the opposite pole of the battery, thus placing the motor B directly across the battery terminal, but having resistance R interposed in its circuit. In the same manner, the circuit may be traced to contact 22, plate 2′, contact 23 to wire 43, thence through the upper reversing switch and the motor A to contact 6′ through brush 19′, contact plate 4′, resistance R′ to contact 3, thence by wire 41 to contact 20, plate 2, contact 21 to the opposite side of the battery. Both motors are now in parallel with the resistances interposed in their circuit, while all of the field windings of each motor are again included in the respective circuit of each motor. A further movement of the controller handle carries the brush contacts 19 and 19′ until they rest upon contact 3′ and contact plate 6 and upon contact plate 6' and contact plate 3, in which position the resistance R and R' are removed from the circuit and both of the motors are now in parallel with all of their coils in series respectively and without external resistance, which has been interposed for the purpose of preventing excessive rise in the current of either machine at the instant the change is made from series to parallel connection. Continued movement of the controller handle, whereby the brushes 19 and 19' are moved forward in the direction of the arrow, will cut out the field coils of each motor, as may be readily traced on the diagram without following the circuit through for each particular connection until brushes 19 and 19' finally connect the segments 18 with 3' and 18' with 3 when all of the coils and groups of coils have been removed from the circuit of each motor except coils F—F$^1$—F$^2$—F$^3$—, which are the coils producing the maximum speed of the motor.

This invention is intended to provide a simple means of controlling two motors, particularly for the operation of street cars and it will be readily understood that if it be desired to operate four motors that a duplicate set of contacts could be incorporated in one controlling case operated by one controller handle. This motor and method of control is also adapted to the operation of heavy automobile trucks in which each motor drives a separate wheel, thereby dispensing with counter-shafts, gears, differential, etc.

Having thus described my invention, what I claim as new and desire to secure by Letters Patent is—

1. The combination with a plurality of series motors, each having field windings consisting of a plurality of groups of coils, each group being composed of a different number of turns wound to have each a predetermined ohmic resistance, of a controlling switch, connections between said controlling switch and said motors for cutting said groups of coils out successively and progressively while the motors are in series and means for connecting the motors in parallel after first replacing all of said coils in circuit.

2. In series parallel series motor control, the combination with a plurality of motors each having field coils wound in groups of different resistances; and means for removing said groups progressively to increase the speed of said motors while connected in series, of means for restoring said groups and connecting the motors in parallel, and means for then removing said groups progressively to further increase the speed.

3. In series parallel series motor control, the combination with a plurality of motors each having field coils wound in groups of different resistances, and means for removing said groups progressively to increase the speed of said motors while connected in series, of means for restoring said groups and connecting the motors in parallel, means for preventing abnormal flow of current while changing from series to parallel, and means for then removing said groups progressively to further increase the speed.

4. In series parallel series motor control, the combination with a plurality of series motors each having field coils wound in groups of differing resistances, and means for removing said groups progressively to increase the speed while the motors are connected in series, of means for restoring said groups and connecting the motors in parallel without opening the circuit, and means for then removing said groups progressively when connected in parallel, to further increase the speed.

5. In series parallel series motor control, the combination with a plurality of series motors, each having interpoles in series with the armature and field coils wound in groups, and means for removing said groups progressively to increase the speed and the interpole magnetization while the motors are connected in series, of means for restoring said groups and connecting said motors in parallel, and means for then removing said groups progressively when connected in parallel, to still further increase the speed.

6. The combination with a series motor having field coils wound in groups on each pole, said groups comprising different numbers of turns and being of different resistance, of interpoles in series with the armature and with said groups of coils, and means for cutting said groups out successively and progressively whereby to vary the field and interpole magnetization and the armature current.

In testimony whereof I affix my signature, in presence of two witnesses.

FRANK B. RAE.

Witnesses:
 HENRY P. DOWST,
 S. W. HUMPHREY.